United States Patent [19]

Nishide et al.

[11] 4,351,576
[45] Sep. 28, 1982

[54] OIL FILM BEARING FOR ROLLING ROLL

[75] Inventors: Teruyuki Nishide; Takayuki Naoi; Makoto Shitomi; Keiichi Hamada; Hidetami Noguchi, all of Kurashiki, Japan

[73] Assignee: Kawasaki Steel Corporation, Kobe, Japan

[21] Appl. No.: 237,625

[22] Filed: Feb. 24, 1981

[30] Foreign Application Priority Data

Jul. 8, 1980 [JP] Japan .................... 55-92201

[51] Int. Cl.³ .................... F16C 17/02; B21B 31/07
[52] U.S. Cl. .................... 308/37; 308/63; 308/72; 308/237 A; 308/70
[58] Field of Search .................... 308/8, 37, 63, 68, 72, 308/176, 237 R, 237 A

[56] References Cited

U.S. PATENT DOCUMENTS

| 420,951 | 2/1890 | Millhauser | 308/237 A |
|---|---|---|---|
| 536,048 | 3/1895 | Shofield | 308/237 A |
| 2,018,055 | 10/1935 | Dahlstrom | 308/70 |
| 2,503,028 | 4/1950 | Cook | 308/8 |
| 2,543,154 | 2/1951 | Cox | 308/70 X |

FOREIGN PATENT DOCUMENTS 931252 10/1947 France .................... 308/37
51-112760 10/1976 Japan .

Primary Examiner—Robert S. Ward, Jr.
Attorney, Agent, or Firm—Balogh, Osann, Kramer, Dvorak, Genova & Traub

[57] ABSTRACT

An oil film bearing for rolling roll consisting of a bushing in a roll chock bearing box and a sleeve tightly engaged with a rolling roll tapered neck to form a journal to the bushing is improved by that said sleeve is provided with a portion which projects from a smaller diameter end of the rolling roll tapered neck, a keyway is provided in an inner circumference of the projected portion of the sleeve and a holder, by which a radially inner end of the key inserted in the keyway is anchored, is provided at the smaller diameter end of the tapered neck.

3 Claims, 12 Drawing Figures

One Roll Rotation

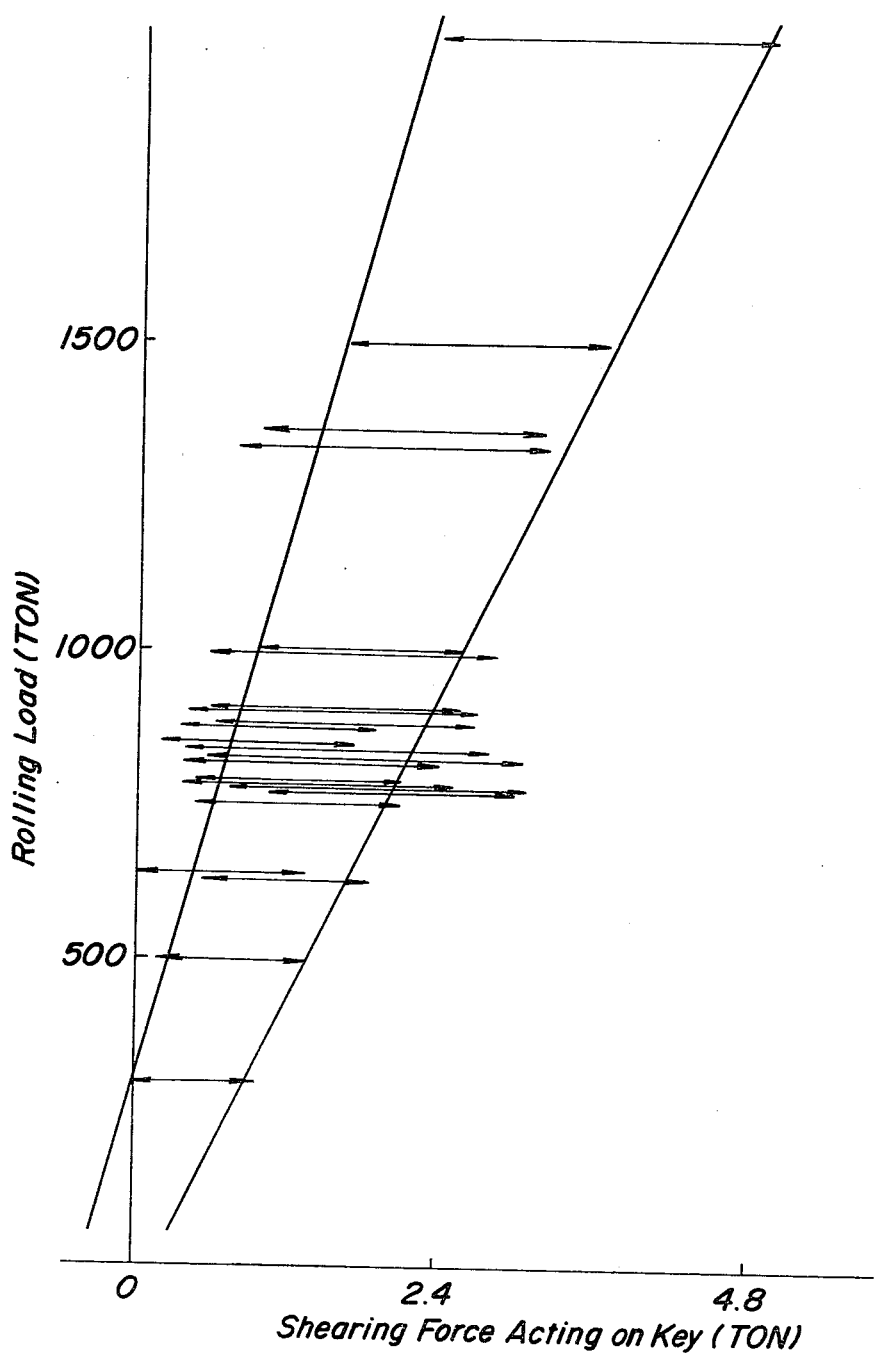

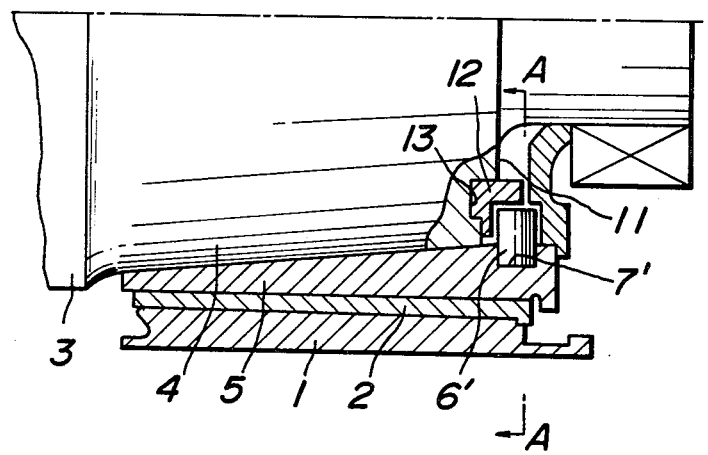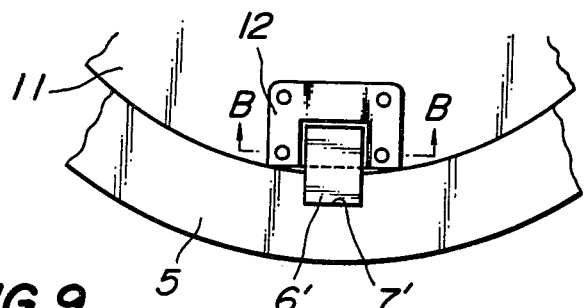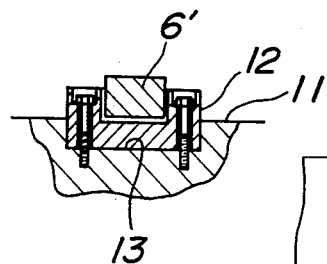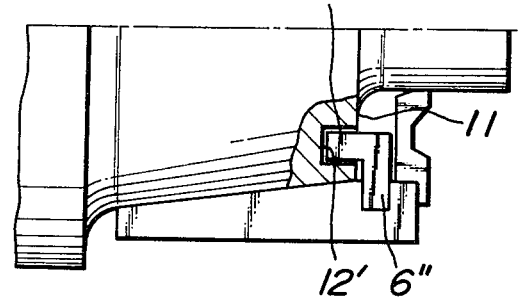

OIL FILM BEARING FOR ROLLING ROLL

The present invention relates to improvement of an oil film bearing for a rolling roll, particularly a rolling roll having a tapered neck.

For better understanding of the invention, reference is taken to the accompanying drawings, wherein.

FIG. 5, a and b are schematic views for illustrating the means for measuring the compression strain acting to the key;

FIG. 6 is a graph showing the relation of the rolling load to the shearing force acting to the key;

FIG. 7 is a vertical cross-sectional view of a preferred example of the present invention;

FIG. 8 is an elevation as viewed in a direction of arrows A—A in FIG. 7;

FIG. 9 is a sectional view taken along the line B—B in FIG. 8;

FIG. 10 is a partial sectional view showing a modified example; and

Figure 11:
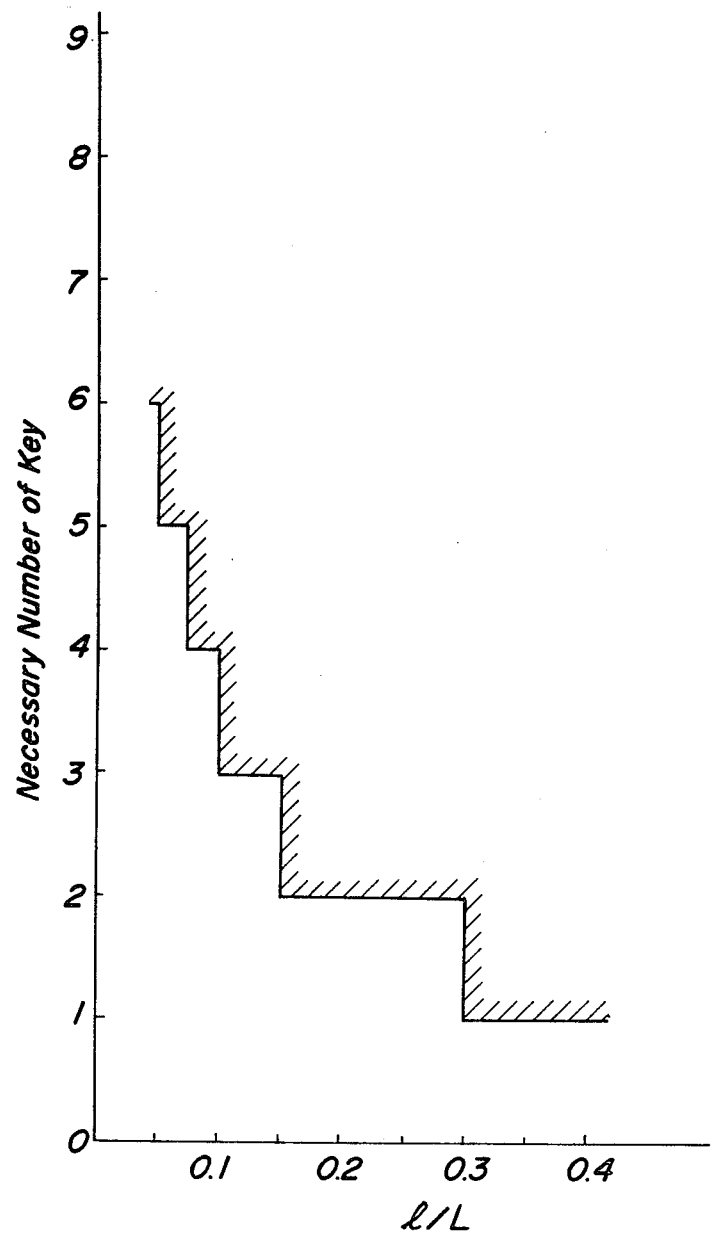

FIG. 11 is a graph showing the relation of a ratio (l/L) of the key length l to the bearing pressure receiving zone L to the necessary number of the key.

Figure 1:
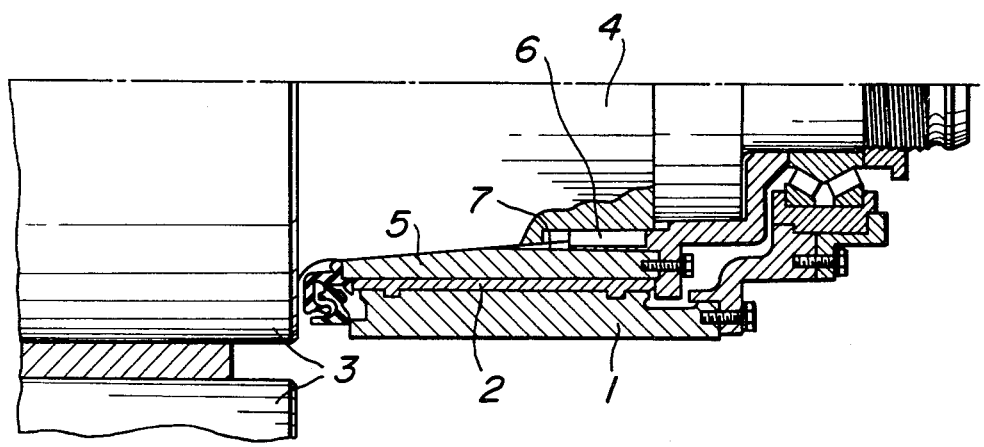
FIGS. 1 and 4 are vertical cross-sectional views of conventional tapered neck oil film bearings.

This oil film bearing for tapered neck is generally referred to as morgoil bearing and as shown in FIG. 1, the oil film bearing consists of a bushing 2 provided in a roll chock bearing box 1 and a sleeve 5, which is tightly engaged with a tapered neck 4 of a rolling roll 3 to form a journal to the bushing 2 and a key 6 is used for preventing rotation of the sleeve 5 with respect to the tapered neck 4.

In a rolling mill wherein the rolling roll is journaled by such an oil film bearing, variation of rolling force due to the eccentricity of the rotation center of the rolling roll often becomes problem as a cause that the precision of thickness of the rolled sheet is disturbed and rolling mill makers have considered that this is inevitable in view of the structure of the oil film bearing in the prior technique.

Figure 2:
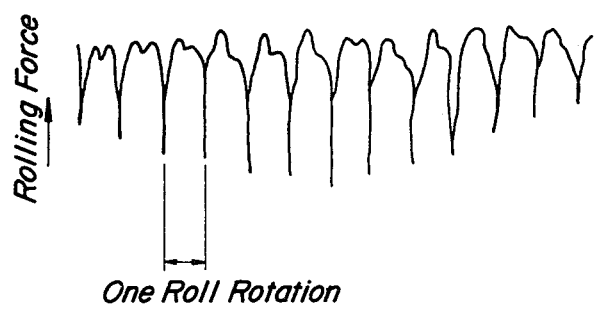
FIG. 2 is a graph showing the variation of rolling force caused by rotation of a rolling roll.

Presently, in continuous rolling of sheets, it has been attempted to uniformize the sheet thickness in the longitudinal direction of the rolled sheet by effecting automatic gauge control (hereinafter abbreviated as "AGC") in many cases by BISRA system wherein the variation of the thickness of the rolled sheet is read from the variation of the rolling load and the roll gap is controlled depending upon the variation degree to control the sheet thickness desirably but in the rolling mill wherein the rolling roll is journaled to the prior tapered neck oil film bearing as mentioned above, the variation of the rolling load appears owing to the eccentricity of the rolling roll at every rotation of the rolling roll as shown in FIG. 2 and particularly a negative peak is extremely applied and such sudden variation of rolling force cannot be corrected in the present AGC.

This sudden variation of rolling force is mainly influenced by the keyway of the sleeve, the relative rotation of which is prevented by a key provided at the tapered neck of the rolling roll in the oil film bearing as disclosed in Japanese Patent Laid-open application No. 112,760/76.

Namely, as shown in FIG. 1, the keyway 7 provided at the taper portion of the sleeve 5 is made to be slightly larger than the height of the key 6 projecting from the tapered neck 4 considering the thermal expansion of the key 6, so that a gap is formed between a bottom of the keyway 7 and the key 6. Accordingly, when the keyway 7 is aligned with the position where the sleeve 5 is subjected to the rolling force, the sleeve 5 causes the elastic deformation and the rolling force is suddenly reduced.

Such sudden variation of the rolling force influences greatly upon the precision of the sheet thickness and the thus formed unevenness of the sheet thickness is not completely removed even by the subsequent rolling.

Figure 3:
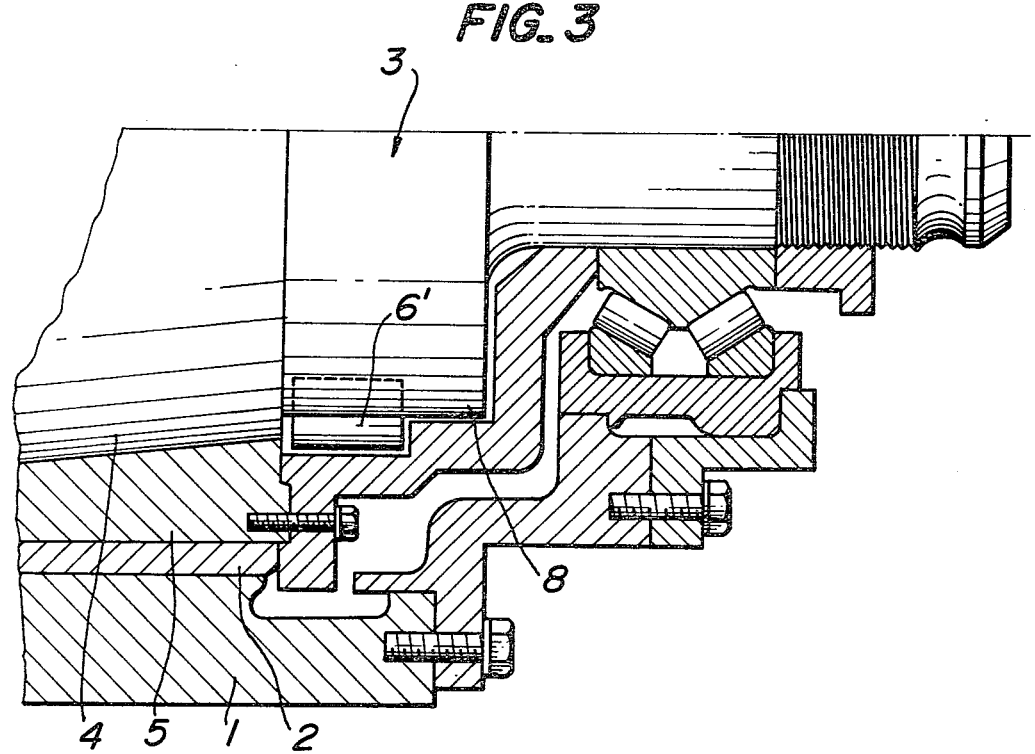
FIG. 3 is a vertical cross-sectional view of an improved oil film bearing.
Figure 4:
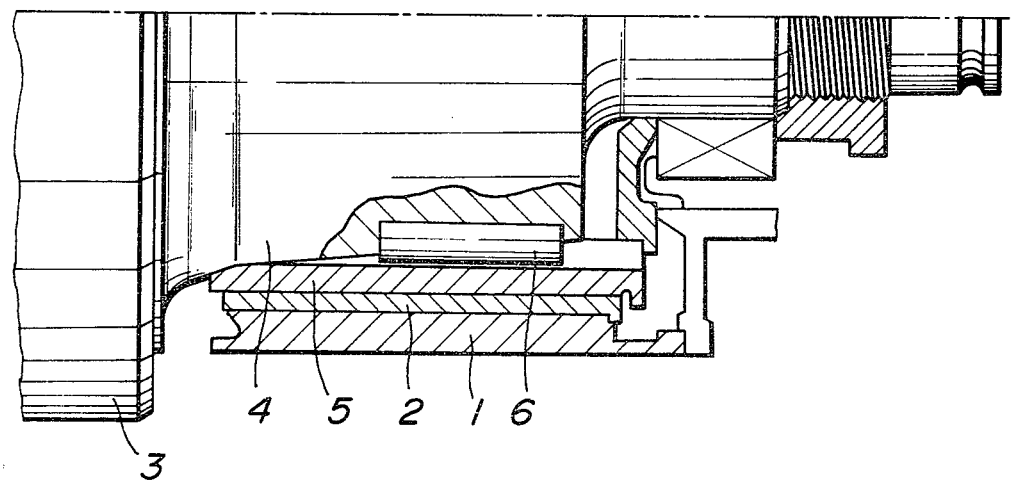

In the tapered neck bearing disclosed in the above described Japanese Patent Laid-open application No. 112,760/76, this problem has been solved by not providing a key 6' for fixing a sleeve 5 to a rolling roll 3 at a tapered engaging zone of the sleeve 5 and the roll neck but by providing said key 6' at a straight neck portion 8 connecting to the tapered neck 4 as shown in FIG. 3. However, in this case even though there is no problem when the rolling mill is newly manufactured, when this means is applied to an already used rolling mill, the range to be modified is large, so that a variety of difficulties are caused.

That is, in the neck portion of the rolling roll, there is a case where no straight neck connecting to the tapered neck 4 is provided and in this case it is necessary to elongate the neck portion of the rolling roll 3 by the length of the straight neck and the cost necessary for such construction is high, so that such a means is not practical.

The inventors intend to propose an oil film bearing for a rolling roll, which can be easily applied to a prior rolling mill and advantageously solve the problem of sudden variation of the rolling load due to the keyway.

Figure 5A:
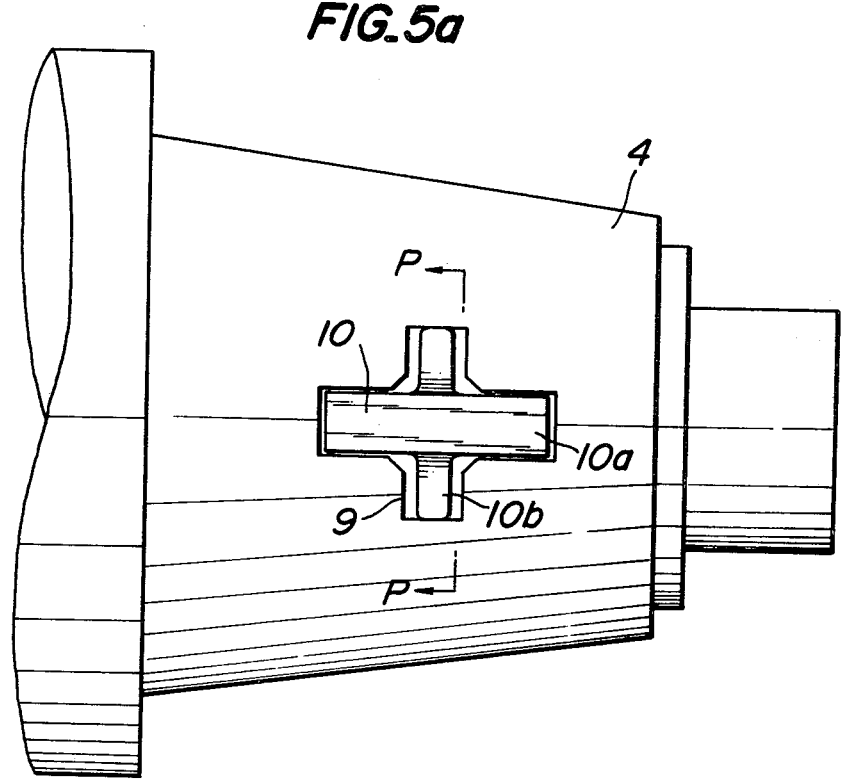
Figure 5B:
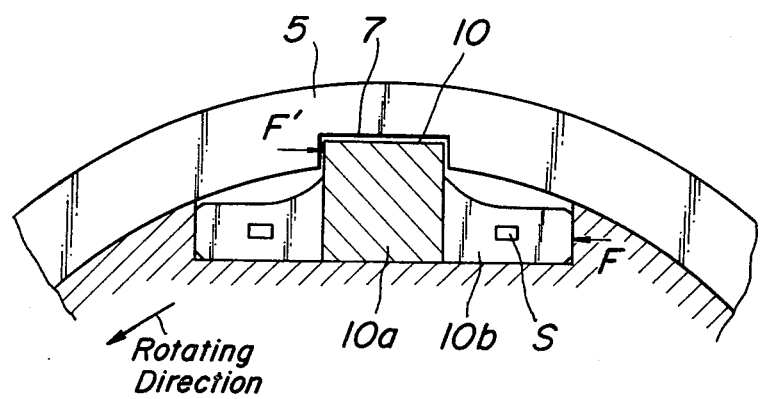

The inventors have made measurement with respect to the shearing force acting to a key during practically rolling in order to determine the parameters necessary for the key. For the measurement, a finishing rolling mill of hot strip under very severe working conditions was used and forces acting to the key under various working conditions were determined by using a measuring apparatus as shown in FIGS. 5a and 5b.

In this measuring apparatus, a cross groove 9 extending in axial direction of the roll 3 and in rectangular direction to the axial direction as shown in FIG. 5, a and b is provided and a measuring key 10 as shown in FIG. 5, b, which is constructed with a main portion 10a which is tightly engaged with the groove in the axial direction and serves anchor with respect to the keyway 7 of the sleeve 5, and branched arms 10b extending to both sides of the main portion 10a, is made. The end portions of the branched arms 10b are tightly fitted to the ends of the groove formed rectangularly to the axial direction groove and strain gauges S are attached to the branched arms 10b and compression strain generated on the branched arm 10b corresponding to the force F applying to an end of the branched arm 10b of the measuring key 10 from the roll 3 and the reaction force F' acting to the keyway 7 of the sleeve 5 where receives the rotating force of the main portion 10a of the key 10, is measured.

When the shearing force acting to the measuring key was determined from the measured value of the compression strain, the shearing force was about 5 tons in the maximum value even in the hot strip mill under a very severe working condition as shown in FIG. 6 and it has been found that the key size necessary for enduring this shearing force can be reduced to about 1/9 of the key size (length: 305 mm, width: 100 mm, height: 75 mm) usually used in the prior rolling mill in the area supporting the shearing force and the object can be fully attained by a shorter key.

Based on this investigated result, a variety of experiments and studies have been made and it has been found that the sleeve tightly engaged with the tapered neck of the rolling roll is provided with a portion which is projected from a smaller diameter end of the tapered neck, a keyway is formed at the inner circumference of the projected portion and a holder which anchors a radially inner end of the key inserted in the keyway, is provided at the smaller diameter end surface of the tapered neck, whereby the given object can be advantageously attained.

The invention will be explained with respect to the preferred examples shown in FIG. 7 to FIG. 9. In these examples, the same parts as in the prior embodiments are shown by the same reference numerals and a numeral 5 is a sleeve, a keyway 7' is formed at a portion of the sleeve 5 where is projected from the tapered neck 4 of the rolling roll and a key 6' is inserted in the keyway 7'. A radially inner end of the key 6' is anchored with a holder 12 fixed to a smaller diameter end surface 11 of the tapered neck 4, for example, with bolts as shown in FIG. 8, whereby the relative rotation between the tapered neck and the sleeve is effectively prevented.

In this case, shearing force also is applied to the holder 12, so that as shown in FIG. 9, it is advantageous to embed the holder 12 in a recess 13 provided in the smaller diameter end surface 11.

FIG. 10 shows a modified embodiment of the holder 12 and the key 6' and the key 6'' has a project a at the radially inner end of the key 6' and the holder 12' is a hole provided at the smaller diameter end surface 11 of the tapered neck 4 and the project a of the key 6'' is anchored to the smaller diameter surface 11 of the tapered neck with this hole.

Furthermore, when a sufficiently long straight neck portion 8 as shown in FIG. 3 is not present but a straight neck portion having a length conforming to the transversal thickness of the key 6' is present, a groove conforming to the above described key holder is provided at the circumferential surface of this straight neck portion and the key 6' is anchored with this groove.

Thus, in usual rolling, the sudden variation of the rolling load due to the keyway does not occur and the stable operation can be made under the exact AGC.

However, the role of the key used for oil film bearing is not only to prevent a rotation of the sleeve relative to the roll upon rolling but also to endure the maximum torque until a safety device, such as an over load clutch provided at a driving spindle considering a burning accident owing to oil film break between the sleeve and the bushing, starts and to prevent the burning accident due to sliding between the roll and the sleeve to protect the roll. For the purpose, in the presently used keys, the size has been determined with reference to a large number of accidents considering this point and a ratio l/L of the total length l of the key to the length L of the bearing pressure receiving zone has been determined to be at least about 0.3.

Accordingly, when a key in which the length is shortened, is used, the key should have the same shearing strength as in the prior key but this problem has been solved by providing a plurality of key connections.

Concerning the oil film bearing to be used for the hot finishing rolling mill, an investigation was made with respect to the number of the key connection necessary for obtaining the shearing strength (l/L=0.3) of the conventional degree when the length l of the key is varied in l/L from 0.05 to 0.4 and the obtained results are shown in FIG. 11.

As seen from FIG. 11, when l/L is 0.1–0.2, the number of the shortened keys may be 2–3 and these keys are preferably arranged in the equal interval along the cicumference at the ends of the fitting zone.

The oil film bearing according to the present invention is very simply applied to the prior rolling mill and it is merely necessary to newly manufacture only sleeve and the keyway already provided in the tapered neck of the roll is filled with a metal or may be used as it is and then a holder is provided at the smaller diameter end surface of the tapered neck according to the present invention.

Furthermore, the present invention can be applied to all multi-stage rolling mills in which an oil film bearing, such as morgoil bearing or mesta bearing is used as a bearing for a rolling roll.

As mentioned above, the present invention can greatly reduce the sudden variation of the rolling force due to the keyway in the sleeve without lowering the shearing strength of the key, so that the correction of control of the sheet thickness can be effected by AGC and therefore the gauge precision of the rolled sheet is noticeably improved.

When the present invention is applied to the finishing rolling mill of hot strip, the load variation has been reduced from about 60 tons to about 15 tons and the gauge precision has been broadly improved.

When the present invention is particularly applied to the hot rolling, the rolled sheet can be taken out at low temperature from a heating furnace owing to improvement of AGC, so that the energy save can be expected.

What is claimed is:

1. In an oil film bearing for rolling roll consisting of a bushing in a roll chock bearing box and a sleeve tightly engaged with a rolling roll tapered neck to form a journal to the bushing, the improvement comprising that said sleeve is provided with a portion which projects from a smaller diameter end of the rolling roll tapered neck, a keyway is provided in an inner circumference of the projected portion of the sleeve and a holder, by which a radially inner end of the key inserted in the keyway is anchored, is provided at the smaller diameter end surface of the tapered neck.

2. An oil film bearing as claimed in claim 1, wherein the holder is embedded in a recess formed in the smaller diameter end of the tapered neck.

3. An oil film bearing as claimed in claim 1, wherein the key has a projection at a radially inner end of the key and the holder is a hole provided at the smaller diameter end of the tapered neck to anchor the projection of the key.

* * * * *